(12) United States Patent
McEachron

(10) Patent No.: US 10,008,102 B1
(45) Date of Patent: Jun. 26, 2018

(54) SYSTEM AND METHOD FOR MONITORING RADIO-FREQUENCY (RF) SIGNALS FOR SECURITY APPLICATIONS

(71) Applicant: United Services Automobile Association (USAA), San Antonio, TX (US)

(72) Inventor: Jon Daniel McEachron, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 128 days.

(21) Appl. No.: 15/085,612

(22) Filed: Mar. 30, 2016

Related U.S. Application Data

(60) Provisional application No. 62/156,714, filed on May 4, 2015.

(51) Int. Cl.
G08B 25/10 (2006.01)

(52) U.S. Cl.
CPC .................................. *G08B 25/10* (2013.01)

(58) Field of Classification Search
CPC ........ G08B 25/10; G06Q 40/08; G06Q 50/22; G06Q 40/00; G06Q 50/24; G06Q 40/02
See application file for complete search history.

(56) References Cited

U.S. PATENT DOCUMENTS

| | | | | |
|---|---|---|---|---|
| 2015/0339912 A1* | 11/2015 | Farrand | ................... | G08B 25/00 340/501 |
| 2015/0342542 A1* | 12/2015 | An | ........... | A61B 5/747 455/404.2 |
| 2015/0348341 A1* | 12/2015 | Baxley | .................... | H04W 4/22 340/5.2 |
| 2015/0348342 A1* | 12/2015 | Baxley | .................... | H04W 4/22 340/5.81 |
| 2015/0350233 A1* | 12/2015 | Baxley | .................... | H04W 4/22 726/1 |
| 2015/0350862 A1* | 12/2015 | Baxley | .................... | H04W 4/22 455/404.2 |
| 2015/0350902 A1* | 12/2015 | Baxley | .................... | H04W 4/22 726/7 |

* cited by examiner

*Primary Examiner* — Sisay Yacob
(74) *Attorney, Agent, or Firm* — Fletcher Yoder, P.C.

(57) ABSTRACT

The present disclosure relates generally to systems and method for monitoring and preserving radio-frequency (RF) signals for security applications, such as home, vehicle, personal, or business security applications. An example customer interface device (CID) includes sensing circuitry configured to detect radio-frequency (RF) communication signals near an asset associated with the CID. The CID is configured to locally store information regarding the detected RF communication signals. When the CID determines that a trigger event has occurred, the CID may provide an online service with the information regarding the RF communication signals detected near the asset around the time of the trigger event to be preserved for later analysis.

20 Claims, 4 Drawing Sheets

SYSTEM AND METHOD FOR MONITORING RADIO-FREQUENCY (RF) SIGNALS FOR SECURITY APPLICATIONS

CROSS REFERENCE TO RELATED APPLICATION

This application claims priority to and the benefit of U.S. Provisional Application No. 62/156,714, entitled "CUSTOMER INTERFACE SYSTEM AND METHOD," filed May 4, 2015, which is hereby incorporated by reference in its entirety for all purposes.

BACKGROUND

The present disclosure relates generally to systems and method for monitoring and preserving radio-frequency (RF) signals for security applications, such as home, vehicle, personal, or business security applications. The present disclosure also relates generally to systems and methods that provide an interface between a customer and an online service.

The modern world is filled with human-generated RF signals. These signals include intentionally generated communication signals (e.g., WiFi, Bluetooth, cellular, television broadcast signals) as well as RF noise produced by the operation of various electrical devices. These RF signals may span a range of frequencies from a just few hertz to (e.g., 3 Hz) to a few gigahertz (e.g., 3 GHz). Additionally, RF signals may travel directionally or omnidirectionally from their source, and may have various levels of penetration into different types of materials, depending on the nature of the signals and the materials through which they pass.

Modern businesses offer an array of services via the Internet. In the early days of the Internet, customers would generally interface with online services using a traditional computing device, such as a desktop or laptop computer. Presently, there is a wide array of devices that are available on the market that enable users to access online services, many of which lack the traditional keyboard/mouse/monitor interface. For example, many set-top entertainment systems enable users to use a simple remote control to view online streaming video services on a home television. By further example, current smart phone devices include apps that enable users to use touch screen interfaces, motion input, as well as spoken commands and queries, to interact with online services. As a specific example, certain smart phone devices include functionality that enables the device to receive a spoken natural language query, to process the query using a speech analysis system, to determine responses to the query using an artificial intelligence system, and to provide the user with the responses in visual and/or spoken form.

BRIEF DESCRIPTION

In an embodiment, a customer interface device (CID) includes communication circuitry configured to communicatively couple the CID to an online service. The CID includes sensing circuitry configured to detect radio-frequency (RF) communication signals near an asset associated with the CID. The CID also includes memory circuitry configured to store instructions and information regarding the detected RF communication signals. The CID further includes processing circuitry coupled to the communication circuitry, the sensing circuitry, and the memory circuitry, wherein the processing circuitry is configured to execute the instructions stored in the memory circuitry to: store, in the memory circuitry, information regarding the RF communication signals detected by the sensing circuitry, determine that a trigger event has occurred and, in response, provide, via the communication circuitry, the online service with the information regarding the RF communication signals detected near the asset around the time of the trigger event.

In another embodiment, a method includes detecting RF signals near an asset using sensing circuitry of a customer interface device (CID) associated with the asset. The method includes storing information regarding the RF signals detected by the sensing circuitry in memory circuitry of the CID. The method also includes determining, via processing circuitry of the CID, that a trigger event has occurred near the asset associated with the CID. The method further includes providing, as output, the information stored in the memory circuitry regarding RF signals detected near the asset around the time of the trigger event.

In another embodiment, a non-transitory, computer-readable medium stores instructions executable by a processor of an electronic device. The instructions include instructions to detect RF signals near an asset using sensing circuitry of a customer interface device (CID) associated with the asset. The instructions include instructions to store information regarding the RF signals detected by the sensing circuitry in memory circuitry of the CID. The instructions also include instructions to determine, via the processing circuitry, that a trigger event has occurred near the asset associated with the CID. The instructions further include instructions to provide, as output, the information stored in the memory circuitry regarding RF signals detected near the asset around the time of the trigger event.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward a customer interface device (CID) capable of monitoring, capturing, and analyzing aspects of electronic observations, wireless communications, and/or device signatures from the environment near an asset, such as a structure or location (e.g., a home, business, government building, or public space), a vehicle (e.g., a passenger or cargo vehicle, automobile, boat, or recreational vehicle), or a person (e.g., a customer, employee, family member, civil servant). For example, in certain embodiments, the CID analyzes the captured environmental data (e.g., RF signals, alarm signals, audio/video recordings) to determine normal activity, as well as to identify variations from this normal activity that may be indicative of present or future issues or concerns. In certain embodiments, the CID may be capable of contacting one or more online services to address or preempt these issues or concerns. Further, in certain embodiments, the captured environmental data may be preserved to establish details surrounding a trigger event, such as an accident or a crime, for use in a subsequent investigation.

Customer Interface Device (CID)

Figure 1:
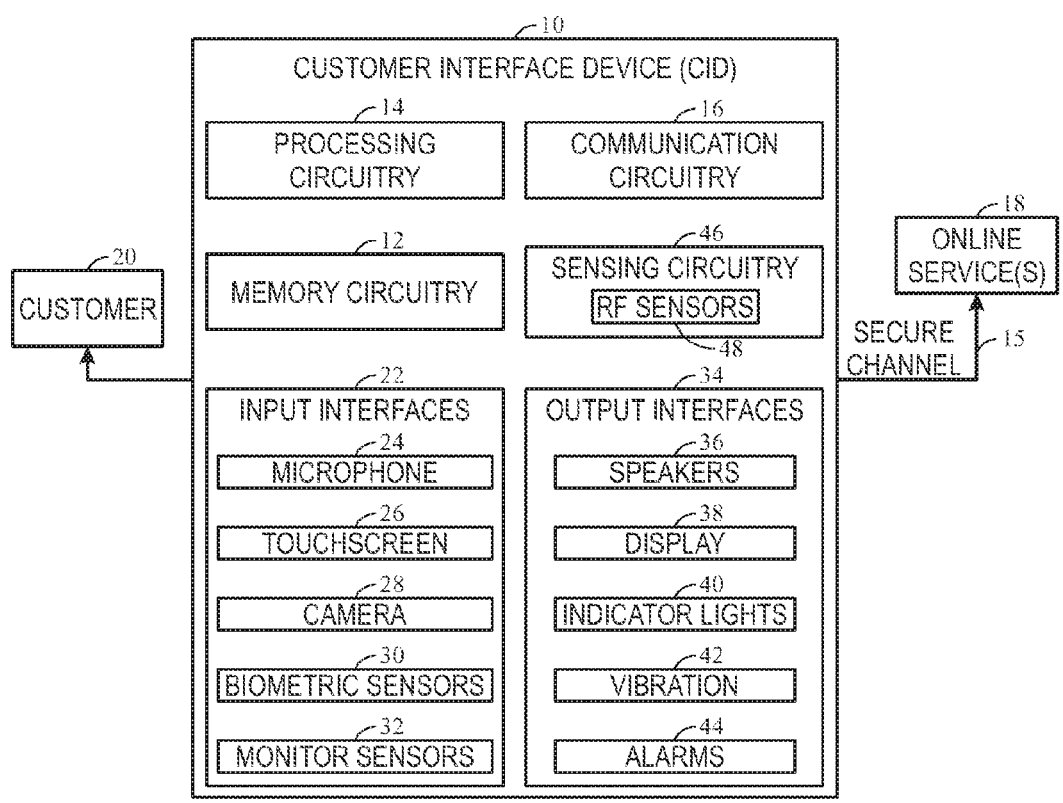
FIG. 1 is a schematic representation of a customer interface device (CID), in accordance with embodiments of the present technique.

FIG. 1 is a schematic that illustrates an example embodiment of the disclosed customer interface device (CID) 10. The CID 10 illustrated in FIG. 1 is a computing device having memory circuitry 12 and processing circuitry 14 generally capable of storing and executing instructions to provide the functionality described below.

In certain embodiments, the CID 10 may be a specialized computing device. In other embodiments, the CID 10 may be a general purpose computing device, such as a laptop computer or a smart phone, that is programmed to execute instructions (e.g., software modules, applications, apps) to provide the functionality set forth below. For example, in certain embodiments, the CID 10 may be formed by the customer on-demand simply by coupling a smart phone to additional hardware (e.g., sensing, processing, or communication circuitry) and executing a suitable app on the smart phone. For such embodiments, the CID 10 may utilize the processing, memory, and communication circuitry, as well as the input and output interfaces of the smart phone, reducing the cost of the CID 10.

The example CID 10 illustrated in FIG. 1 includes communication circuitry 16 that enables the CID 10 to communicate via wired (e.g., Ethernet) or wireless (e.g., cellular, WiFi, Bluetooth®) network connections with one or more online services 18, as well as with devices on a local network. Additionally, the processing and communication circuitry of the CID 10 is capable of establishing an encrypted communication channel (e.g., a virtual private network (VPN) connection or similar secure socket layer (SSL) encrypted connection), or another suitable secure channel 15, to securely communicate with an online service 18. In certain embodiments, the CID 10 may connect (e.g., via WiFi or Bluetooth®) to the smart phone of a customer 20 such that the CID 10 can access online services via the cellular data connection of the smart phone. In other embodiments, the customer 20 may indirectly interact with the CID 10 via a smart phone device, for example, when the customer 20 is not in physical proximity to the CID 10.

The CID 10 illustrated in FIG. 1 includes a number of input devices or interfaces 22 that enable the CID 10 to receive input (e.g., commands, queries, authentication credentials) from the customer 20 and detect activity in the surrounding environment. A non-limiting list of example input interfaces 22 includes: microphones 24, touch screens 26, cameras 28, biometric sensors 30, and motion sensors 32. As discussed in greater detail below, in certain embodiments, the CID 10 may include various system or device interfaces to enable the CID 10 to exchange information with other systems or devices (e.g., home automation systems, home or vehicle security systems, vehicle diagnostic systems). The CID 10 illustrated in FIG. 1 also includes output devices or interfaces 34 to enable the CID 10 to provide information to the customer 20. A non-limiting list of example output interfaces 34 include: speakers 36, displays 38, indicator lights 40, vibration motors 42, and alarms 44. The sensing circuitry 46 of the CID 10 may vary or may not be present in certain embodiments, as discussed in greater detail below.

In an example embodiment, the CID 10 may include a microphone 24 as a principle input device 22 and a speaker 34 as a principle output device 34. For such embodiments, the CID 10 may be generally programmed to interact with the customer 20 via a spoken natural language interface. For example, in certain embodiments, the CID 10 may remain in a low-power or idle state until it is activated by the customer 20 speaking an activation phrase. Further, in certain embodiments, the CID 10 may be capable of receiving and processing spoken natural language queries from the customer and responding to the customer using spoken natural language responses. In general, such embodiments enable the customer to have an untrained, conversational interaction with the CID 10, and the CID 10 seamlessly bridges communication between the customer and the online services 18. This enables greater comfort and accessibility for customers 20, particularly elderly and visually-impaired customers. As appropriate, the CID 10 may be capable of providing the customer 20 with additional information through other output devices 34 (e.g., a display 38) or via a secondary device (e.g., a smart phone or computer) communicatively coupled to the CID 10.

In certain embodiments, the CID 10 may receive voice commands from the customer 20 that may be processed by the CID 10 and/or by servers of the online service 18 to enable the customer 20 to, for example, access account functions, access frequently asked question information, access concierge services, or to speak with a customer service representative. For example, when the online service 18 is a banking service, the CID 10 may enable the customer 20 to, after identity verification, access account balances, access transactional information, change account information, order checks, request spending limit increases, determine current mortgage rates, speak with a customer service representative, or provide other suitable functionality to facilitate interaction between the customer 20 and the online banking service 18. By further example, if the online service is a portal for an insurance company, the CID 10 may enable the customer 20 to, after identity verification, submit claims, determine the status of existing claims, receive advice regarding forms, speak with a customer service representative, send messages to customer service representatives, or provide other suitable functionality to facilitate interaction between the customer 20 and the insurance company. Additionally, the CID 10 and/or the servers of the online services 18 may learn from common questions and queries and adapt, for example, automatically adding common questions and answers to a list of frequently asked questions.

In certain embodiments, the CID 10 may even continue to actively capture and analyze activities near the CID 10, even when the customer 20 is not intentionally interacting with the device. For example, the CID 10, alone or in conjunction with the online service 18, may actively capture and analyze conversations taking place near a microphone 24 of the CID 10, and determine whether a topic that is being discussed is related to the online service 18. If the topic is determined to be related to the online service 18, then the CID 10 may interject information, such as advice, recommendations, or suggestions, into the conversation using the speakers 36 based on data from a data repository of the online service 18. For example, in certain embodiments, customers 20 may enable the CID 10 to listen to conversations and, using intelligent speech analytics, artificial intelligence (AI) engines, solution databases, and/or other resources of the CID 10 and/or the online services, provide helpful suggestions to life events, such as purchasing a car or a home. In situations in which the suggestions are not well-suited for audio delivery, a message or a hyperlink with additional information may be sent to the customer via text message or email, or presented on a display 38 of the CID 10. Additionally, the CID 10 and/or the servers of an online service 18 may learn common questions and queries from these captured conversations and may adapt by adding these questions to a frequently asked questions (FAQs) list.

Secure Access

In certain embodiments, the disclosed CID 10 generally enables the customer 20 to securely interact with one or more online services 18 and, as such, the CID 10 may be capable of customer authentication and secure communication. In general, the CID 10 may use one or more pieces of information to verify the identity of the customer, and this identity verification may be performed by the processor of the CID 10, or by a processor of an online service 18, or a combination thereof. For example, in certain embodiments, the CID 10 may be equipped with one or more biometric sensors 30 (e.g., fingerprint scanners, iris/retinal scanners, visual recognition sensors, voice recognition sensors) that can perform biometric measurements to verify the identity of a customer 20 with an online service 18. In certain embodiments, the CID 10 may enable identity verification for the customer 20 using general voice recognition, a spoken voice-specific key phrase, a signal from a smart phone, or other suitable credentials and combinations thereof. Additionally, in certain embodiments, the CID 10 may include an interface to a global positioning system (GPS), Internet protocol (IP) geographic location systems, and/or other suitable positioning system, to enable the CID 10 to determine its location, which may be considered as a factor when verifying the identity of the customer.

Figure 2:
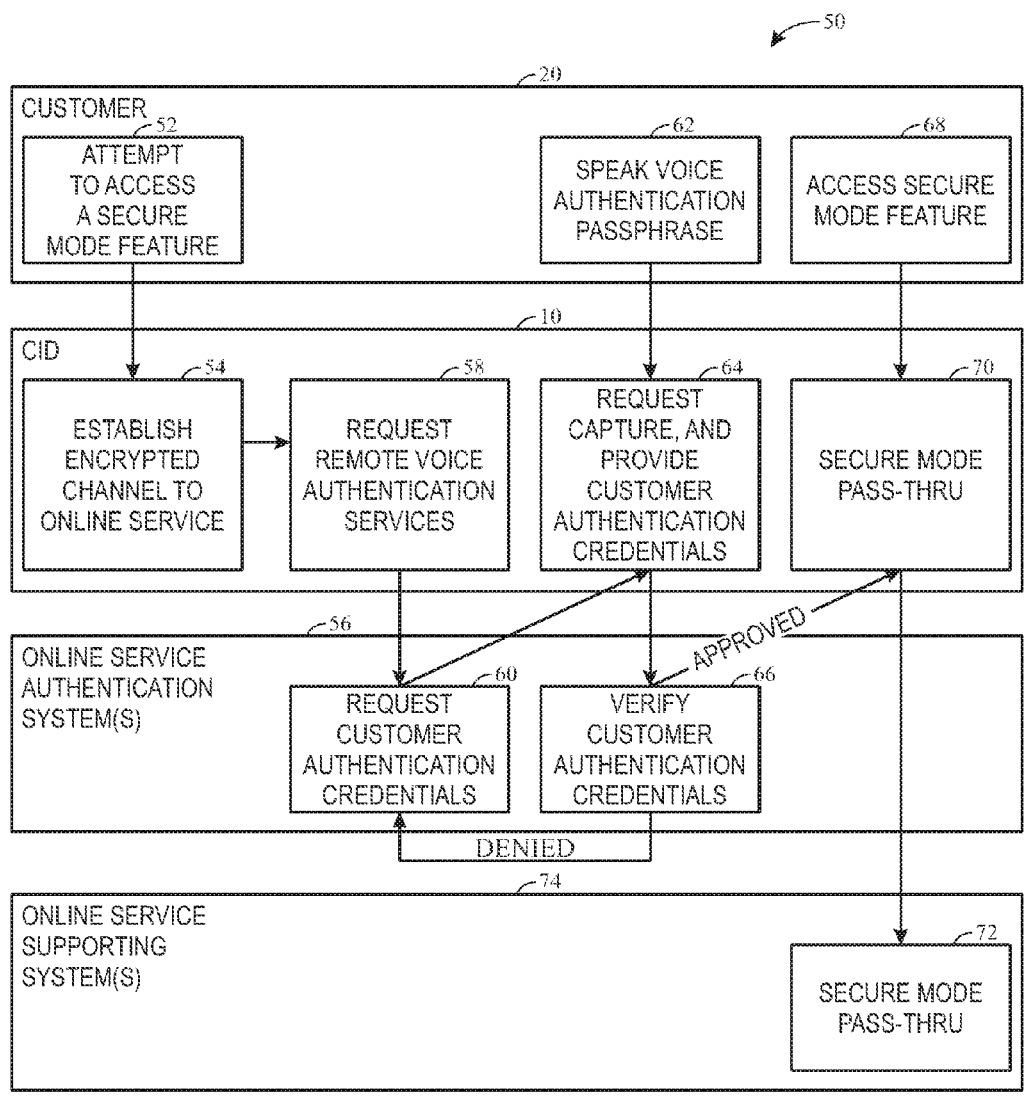
FIG. 2 is a schematic representation of a method whereby the CID and the online service cooperate to verify the identity of a customer, in accordance with embodiments of the present technique.

For example, in certain embodiments, the identity of the customer may be validated in the manner illustrated by the flow diagram 50 illustrated in FIG. 2. In the illustrated example of FIG. 2, the customer 20 first attempts to access (block 52) a function of the CID 10 that requires secure mode operation, such as account management features for a particular online service 18. In response, the CID 10 establishes (block 54) an encrypted channel to an authentication system 56 of the online service 18 and requests (block 58) remote voice authentication. For example, the memory circuitry 12 of the CID 10 may locally store credentials for the CID 10 (e.g., a digitally signed certificate, a set of private/public keys) that can be used to establish the encrypted communication channel between the CID 10 and the online service 18. Then, the authentication system 56 of the online service 18 requests (block 60) the authentication credentials of the customer 20 from the CID 10. Subsequently, the customer 20 speaks (block 62) the voice authentication passphrase, at the request of the CID 10 (e.g., an audio prompt), and the CID 10 captures and provides (block 64) a voice authentication recording (e.g., a spoken security passphrase), via the encrypted communication channel, to the authentication system 56 of the online service 18 for verification (block 66). In response, the authentication system 56 of the online service 18 approves or denies the CID 10 access based on the credentials supplied by the customer 20. If the CID 10 is denied access, then the customer may be prompted by the CID 10 to provide his or her security credentials for resubmission to the authentication system. If the CID 10 is granted access (block 68), then the CID 10 enters secure mode (e.g., pass-thru secure mode as represented by block 70), which enables the customer 20 to access restricted functionality, such as account management features or other secure mode features 72 provided by supporting systems 74 of the online service. In certain embodiments, the CID 10 may periodically prompt the customer 20 to re-authenticate with the online service 18 for enhanced security during extended sessions of use.

Environmental Monitoring

Furthermore, turning briefly to FIG. 1, in certain embodiments, the sensing circuitry 46 of the CID 10 may include wireless communication sensing circuitry capable of monitoring the local environment for wireless communication signals. For example, the CID 10 may include one or more radio-frequency (RF) sensors 48 capable of detecting, receiving, and measuring RF signals over a range of different frequencies, including frequencies used by WiFi devices and hotspots, Bluetooth devices, cellular devices and towers, satellite phone devices, satellite-based driver assistance systems (e.g., On-star), citizen's band radio devices, ham radio devices, and very high frequency (VHF) radio devices. For example, in certain embodiments, the CID 10 may be capable of detecting WiFi or cellular signals and determining identifying information (e.g., a media access control (MAC) address, cellular node address, international mobile subscriber identity (IMSI), Temporary Mobile Subscriber Identity (TMSI), or other suitable identifiers) from these signals. In certain embodiments, the CID 10 wireless communication sensing circuitry may include or mimic a WiFi hotspot, a cellular tower, or another suitable host device that logs WiFi or cellular devices that attempt to communicate with the CID 10.

Additionally, in certain embodiments, the RF sensors 48 of the sensing circuitry 46 may be capable of identifying the approximate location of a source of a RF signal (e.g., via triangulation), as well as determining movement of the source of the RF signal over time. For example, in certain embodiments, the CID 10 may include a number of RF sensors 48 suitably arranged (e.g., throughout a home or vehicle) to detect the location and movement of the source of a RF signal over time based on the strength of the signal. Furthermore, in certain embodiments, the CID 10 may correlate RF signal data with other data collected by or provided to the CID 10 (e.g., recorded audio and/or video data, alarm data, GPS data) to provide a more coherent record of the environment around the CID 10.

In certain embodiments, the CID 10 may use information gleaned from the sensing circuitry 46 and/or input interfaces 22 to establish a level of normal activity near the CID 10. For example, the CID 10 may determine which cellular and Wi-Fi devices tend to be within the detectable range of the CID 10 at particular times (e.g., a neighbor driving to and from work), how these devices tend to move relative to the RF sensors 48 of the CID 10, and when these devices tend to transmit a certain locations. For example, the CID 10 may determine the typical devices communicating wirelessly near the CID 10, such as devices belonging to the occupants of the home, devices belonging to neighbors, or devices belonging to people performing services (e.g., landscaping, housekeeping, repair, construction) in the nearby neighborhood, and may use this information to establish the level of normal RF activity.

In certain embodiments, the sensing circuitry 46 of the CID 10 may be capable of detecting multiple RF signal sources simultaneously. In certain embodiments, the CID 10 may be programmed to analyze multiple RF signal sources based on identity, location, and movement and determine that these RF signals likely belong to a group of people that are located near or traveling together near the CID 10. In case of groups of bad actors (e.g., gang or mob activity), the CID 10 may be capable of determining a RF "fingerprint" for a particular group of people based on the combination of individual RF signals collected. Furthermore, as mentioned, in certain embodiments, the CID 10 may also receive additional environmental monitoring data, such as input from alarm systems and/or input regarding the availability of security cameras, which may be correlated with the RF monitoring data when establishing the level of normal activity near the CID 10.

In certain embodiments, the CID 10 may store monitoring data, including RF activity near the CID 10, and use this information to identify changes that are indicative of abnormal activity. For example, if the CID 10 suddenly detects a large number of wireless devices communicating near the CID 10 than are typically present, this may be indicative of a gathering of people near the CID 10. By further example, if the CID 10 detects a particular wireless device communicating near the CID 10 at unusual times (e.g., late night, early morning, working hours) on a repeating basis, this may also be indicative of abnormal activity. By still further example, the particular movements of a wireless device (e.g., circling the block or back-and-forth along a road) near the CID 10 may be indicative of abnormal activity. Furthermore, as mentioned, in certain embodiments, the CID 10 may also receive signals from other systems communicatively coupled to the CID 10, and these signals may also be correlated with other monitoring data. For example, in certain embodiments, the CID 10 may receive a signal from an alarm system indicating an alarm trip, which may be an indication of abnormal activity that can be correlated with other monitoring data (e.g., RF signal data, audio/video data, motion data) collected by the CID 10. In certain embodiments, when the CID 10 determines that an abnormal activity may be occurring, the CID 10 may notify the customer and/or one or more online services of the details regarding the abnormal activity in an attempt to proactively address the abnormal activity before a trigger event occurs.

Response to Trigger Event

When a trigger event (e.g., crime, accident, or other incident that warrants later investigation) occurs, the CID 10 is intended to serve as an event data recorder that preserves details in the environment surrounding the incident, particularly RF signal information, for later investigation. For example, as mentioned above, in certain embodiments, the CID 10 may continuously scan for Wi-Fi, cellular, or Bluetooth signals and record time, date, duration, location, and movement information for the signals. Additionally, in certain embodiments, this RF signal data may be correlated with other monitoring data, such as available audio/video surveillance data and alarm trip data, to provide a report that will assist in review and analysis of an incident. In certain embodiments, the sensing circuitry, the input interfaces, or other devices and systems coupled to the CID 10 may automatically detect the occurrence of the trigger event. In certain embodiments, the customer may, additionally or alternatively, use an input interface to notify the CID 10 that the trigger event has occurred.

In order to better preserve the monitoring data collected by the CID 10, in certain embodiments, the CID 10 may store at least a portion of the environmental monitoring data remotely using an online or cloud-based storage service. For example, in certain embodiments, the CID 10 may continually, intermittently, or in response to the trigger event, transmit recorded details regarding the local environment to the online service. As such, if the CID 10 is destroyed along with the asset in the trigger event, or if someone attempts to tamper with the CID 10, the recorded details may still be recovered from the online service.

Additionally, when a trigger event occurs, in certain embodiments, the CID 10 may be capable of providing, as an output, a notification signal or beacon that is intended to be observed by other devices and/or people located near the trigger event. For example, the CID 10 may be disposed in or integral with a vehicle and may output an RF signal, an audio signal (e.g., an audible or ultrasonic tone or sound), and/or a visual signal (e.g., flashing lights, lights of particular colors) in the event of a car accident, wherein the signal includes embedded unique identifying information for the trigger event. If one or more of these signals are recorded (e.g., time stamped) by devices in the area, such as traffic cameras, security cameras, or cell phone cameras, the embedded signal may be captured to serve as a type of watermark that enables the recording to be more quickly and more easily be identified as relevant to an investigation of the accident. Additionally, the signal may serve as a temporal and/or spatial reference point within the audio or video recording to aid in later correlating (e.g., in time, in space) the data captured in the recording with the other event details captured by the CID 10. Further, in certain embodiments, this signal may be used by the devices in the area to determine the identity of a public distributed database record that is associated with the trigger event, as discussed below, such that these devices can identify and update the record. Additionally, in certain embodiments, the signal may also provide a local alert (e.g., an audible alarm, a short message service (SMS alert)) to other devices and/or other people in the area that the trigger event has occurred so that they can take appropriate action.

During a subsequent investigation of the trigger event, a report may be generated from the monitoring data collected by the CID 10, either stored locally or via an online backup service 18. This report can provide a detailed account of wireless communication, and potentially other recorded activities, occurring near the time and location of the incident. Such a detailed account may be instrumental to a law enforcement investigation of a criminal incident by quickly identifying potential witnesses, victims, and perpetrators, as well as easily establishing or discrediting alibis. Since time is of the essence to such investigations, it may be appreciated that the CID 10 is capable of providing a substantial advantage by reducing the amount of time that the investigator spends gathering and correlating information from disparate devices and systems recording data near a trigger event.

Distributed Database

In certain embodiments, a number of Internet-connected devices in the vicinity of a trigger event may be capable of reporting additional information related to the trigger event. In certain embodiments, the information related to a trigger event may be stored online in a distributed database, similar to the BlockChain utilized by Bitcoin®. For example, a public distributed database record may be created online for a trigger event, such as a major freeway accident or a bridge collapse, and any Internet-connected devices that are monitoring or recording aspects of the environment near the accident can update the record with any relevant monitoring data via an Internet connection. In certain embodiments, even a human witness may update the distributed database record (e.g., via a mobile device located near the incident) with a personal account of the incident and/or contact information in case of further inquiry. Additionally, in certain embodiments, the public distributed database record may be inspected by any device with the proper authorization (e.g., proper decryption keys or certificate) and, thereby, the record can self-document its own authenticity. For example, only a device having suitable decryption keys would be capable of decrypting the entire distributed database record and reading the information regarding the incident stored therein.

Set forth below are example embodiments of CIDs 10 for security related applications in a home and a vehicle. It should be appreciated that, in other embodiments, the functionality described herein may be useful in the production of CIDs 10 for similar applications, such as security or monitoring devices for personal security applications, business security applications, law-enforcement applications, military applications, and so forth.

Home Security Applications

Figure 3:
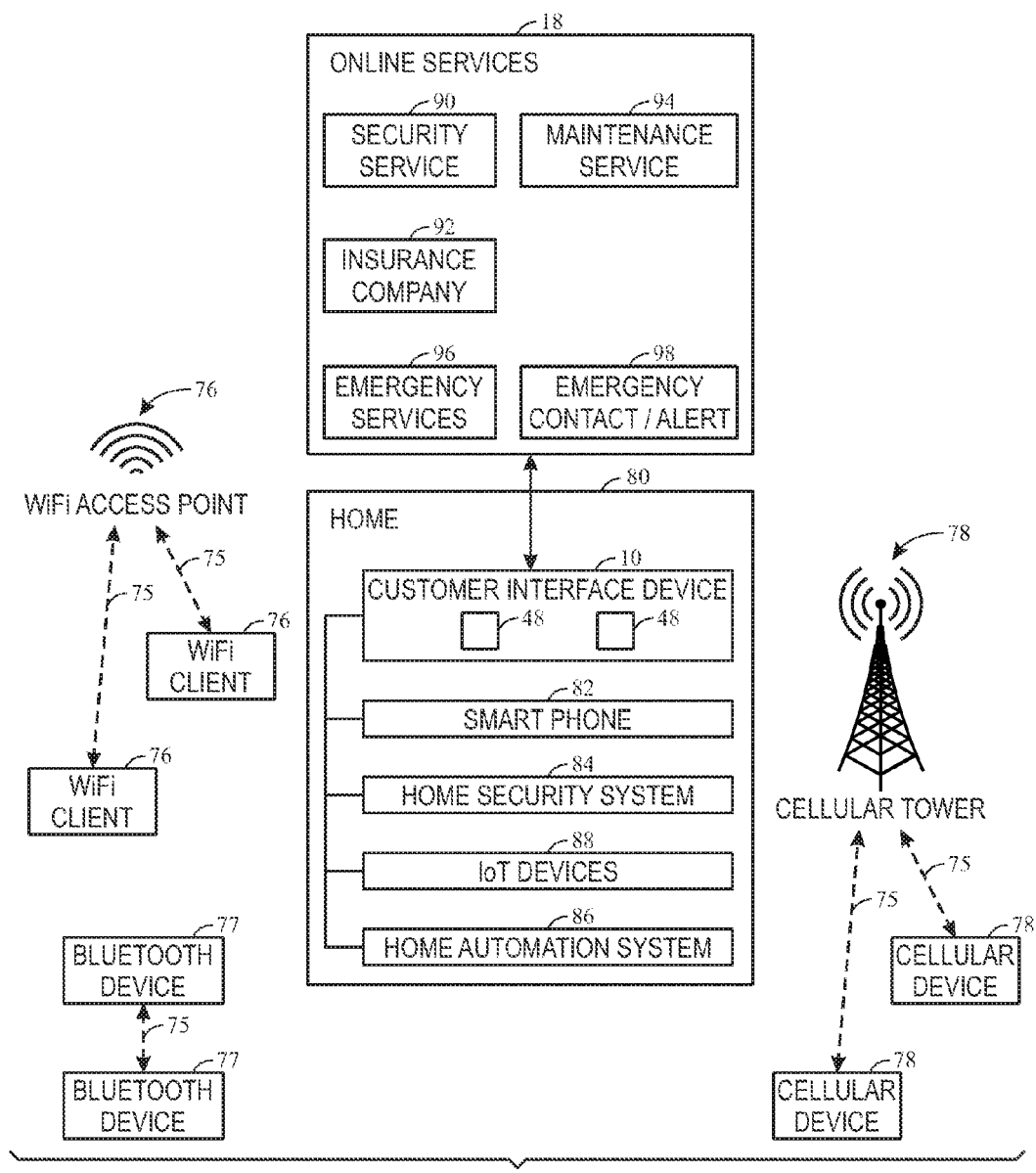
FIG. 3 is a schematic representation of a home security CID, in accordance with embodiments of the present technique.

FIG. 3 illustrates an example embodiment of the CID 10 that is designed for installation in a home 80 and provides functionality related to home security. In certain embodiments, the home security CID 10 includes input devices 22 and sensing circuitry 46 that enables the device 10 to monitor the environment around the home 80. In particular, the illustrated CID 10 includes RF sensors 48 that generally enable the CID 10 to detect and measure RF signals 75 being transmitted near the home 80 by one or more WiFi devices 76 (e.g., WiFi clients, WiFi access points), one or more Bluetooth® devices 77, and one or more cellular devices 78 (e.g., cellular phones, cellular towers), as discussed above.

The input devices 22 and/or sensing circuitry 46 of the home security CID 10 illustrated in FIG. 1 may also include cameras, motion sensors, fire alarm sensors, smoke detectors, carbon monoxide detectors, light sensors, and/or other suitable sensors. As mentioned above, the CID 10 may be communicatively coupled to other devices or systems, including a smart phone 82 of the customer. Additionally or alternatively, in certain embodiments, the home CID 10 may be communicatively coupled to systems of the home, such as home security systems 84 or home automation systems 86, to receive information regarding the status of the home from these systems. In certain embodiments, the home CID 10 may interface with any number of smart devices 88 of the home (e.g., Internet of things (IoT) devices, refrigerators, dishwashers, thermostat, entertainment systems, etc.) and may receive environmental data from these devices as well. It may be appreciated that such IoT devices 88 can provide information to the CID 10 to indicate normal or abnormal activity within the home 80, such as information regarding the current occupancy of the home 80.

In certain embodiments, when the CID 10 determines that an abnormal activity may be occurring near (e.g., in, on, or around) the asset, the CID 10 may notify the customer 20 and/or one or more online services 18 of the details regarding the abnormal activity. A non-limiting list of examples of online services that such embodiments of the CID 10 can connect to include: security services 90, home insurance services 92, maintenance services 94, emergency services 96 (e.g., police, fire department, and medical services), and emergency contact or alert services 98. For example, in certain embodiments, the CID 10 may directly contact and report the abnormal activity to a home or neighborhood security service 90 or local law enforcement services 96 for further investigation. By specific example, the CID 10 may contact a neighborhood security service 90 in response to an unfamiliar cellular signal that is repeatedly detected near the home late at night, and the security service 90 can increase patrols near the home, potentially thwarting a future crime.

Additionally, in case of a trigger event, such as a fire, flood, or break-in event, the CID 10 may serve as an event data recorder that captures and preserves aspects of the environment near the home before, during, and after the trigger event occurs. For example, in certain embodiments, the CID 10 monitors aspects of the home via the input interfaces 22 and/or sensing circuitry 46, determines that a trigger event is occurring (e.g., based on a signal from an home security alarm or smoke alarm), and stores the monitoring data associated with the event in the memory circuitry 12 of the CID 10 and/or in the memory circuitry of a server of an online service 18 for later analysis.

In an example embodiment, a CID 10 may be installed in a home 80, and the sensing circuitry 46 of the CID 10 may include a number of RF sensors 48 disposed at various locations within the home 80, which enable the CID 10 to determine the position of (e.g., triangulate) and movement of a RF signal source (e.g., wireless devices 76, 77, or 78). For the example embodiment, the processing circuitry 14 of the CID 10 may receive different measurements of a particular RF signal collected by RF sensors 48 at different positions within the home 80. Accordingly, based on differences between the measurements (e.g., differences in the strength of the RF signal or differences in when the RF signal is detected, distortion in the RF signal), the CID 10 may determine or estimate a relative location of the RF signal source over time. By specific example, the CID 10 may be capable of determining that a RF signal 75 of a particular cellular device 78 has, for three days in a row, been identified as emanating from the front of the home 80. On the fourth day, the CID 10 may determine that the same source of the RF signal 75 moved past the front of the home 80, and then proceeded around to the back of the home 80, shortly before the home security system 84 of the home 80 was triggered. As such, in certain embodiments, the CID 10 may correlate the presence and movement of the suspicious RF signal source with the alarm data, such that a report can be generated to facilitate an investigation into the incident and any signature data associated with the RF signal and its source.

Vehicle Security Applications

Figure 4:
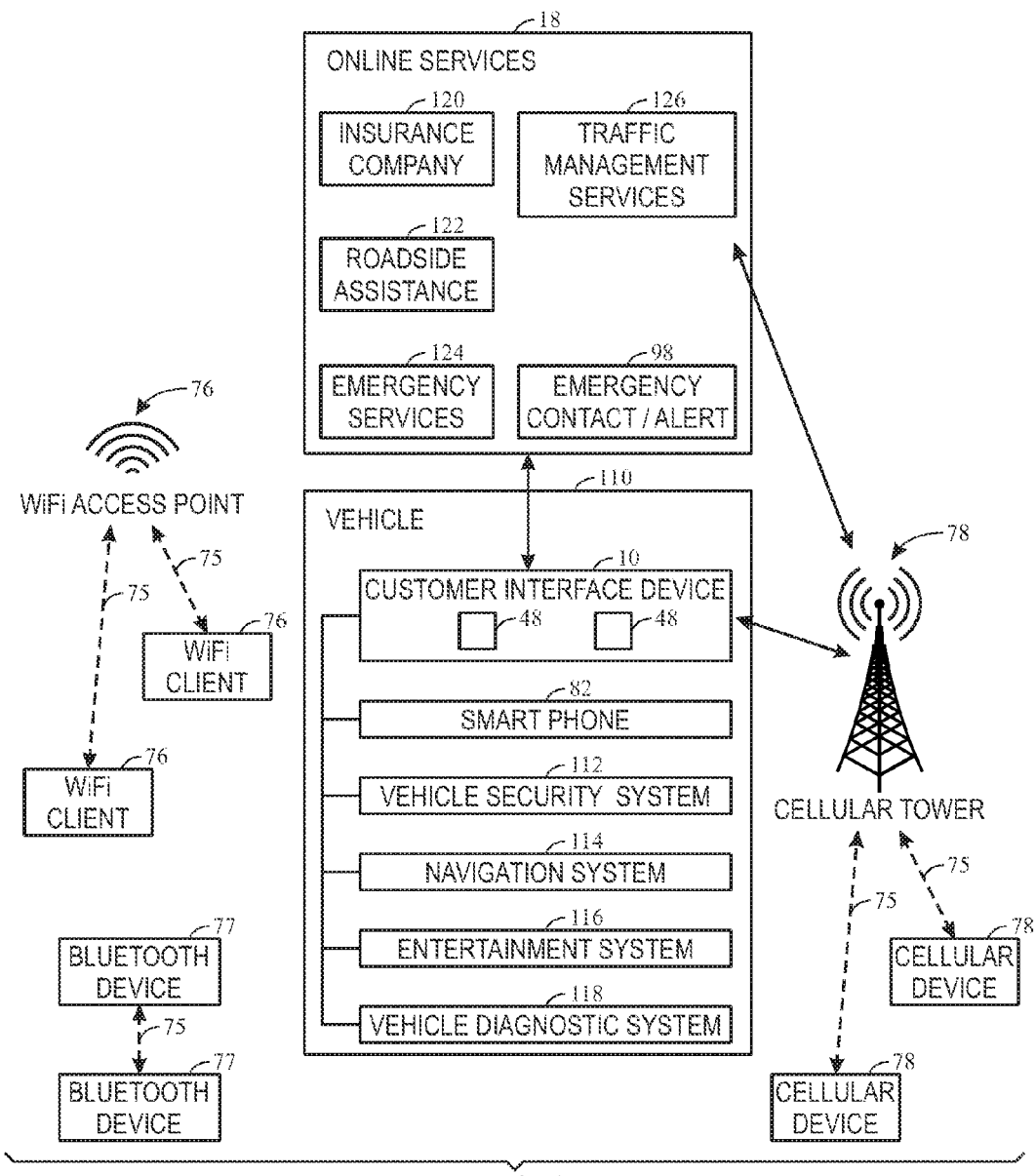
FIG. 4 is a schematic representation of a vehicle security CID, in accordance with embodiments of the present technique.

In certain embodiments, the CID 10 may be designed for installation in a vehicle 110 and provides functionality related to vehicle security. As illustrated in FIG. 4, a vehicle security CID 10 may communicatively couple to a number of other devices or systems of the vehicle 110 or customer. For example, as illustrated in FIG. 4, the vehicle CID 10 might interface with a smart phone 82 of the customer, a vehicle security system 112 (e.g., a car alarm system), a navigation system 114 of the vehicle, an entertainment system 116 of the vehicle, or a vehicle diagnostic system 118 via a wired or wireless interface. A non-limiting list of examples of online services 18 that such embodiments of the vehicle CID 10 can connect to may include: automotive insurance services 120, roadside assistance services 122, emergency services 124, traffic management services 126, and emergency contact or alert services 98. For example, in certain embodiments, the CID 10 may communicate vehicle travel information (e.g., speed, direction, location) to traffic management services 126 to facilitate traffic management. Additionally, the communication circuitry 16 of the illustrated CID 10 enables the device to communicate with the online services 18 (e.g., via a wireless network connection to a cellular device 78 or WiFi device 76).

Additionally, as with certain embodiments discussed above, the vehicle CID 10 may include RF sensors 48 that enable the device to monitor RF communication signals near the vehicle. For example, in certain embodiments, the sensing circuitry of the CID 10 may be capable of detecting, identifying, and locating RF signals 75 from WiFi devices 76, Bluetooth® devices 77, cellular towers 78, or other suitable mobile devices, traversing near the vehicle and logging the information. The CID 10 may be capable of logging information regarding these RF signals 75 when the vehicle 110 is in use or parked. Additionally, the CID 10 may correlate the logged RF signal information with other monitoring data received from connected devices and systems. For example, in certain embodiments, the CID 10 may log and correlate events, such as the vehicle alarm being triggered, the air bags of the vehicle being deployed, or the emergency brake of the vehicle being engaged, with collected RF signal information.

As such, in certain embodiments, the CID 10 may receive information from these various devices and systems to establish normal activity in and around the vehicle 110 and to identify abnormal activity. Additionally, in certain embodiments, the CID 10 may contact one or more online services 18 to attempt to automatically remedy a concern. For example, based on signals from an attached vehicle diagnostic system 118, the CID 10 may automatically contact a maintenance service to schedule maintenance for the vehicle to repair a failing part or perform an oil change. In certain embodiments, the CID 10 may determine that an unfamiliar wireless communication signal 75 determined to correspond to a device approaching the vehicle 110 repeatedly at odd hours as an indication of abnormal activity, and may report the concern to a security service or to local law enforcement for further investigation.

Additionally, in case of a trigger event, such as a collision, theft, or fire, the CID 10 may serve as an event data recorder that captures and preserves aspects of the environment near the vehicle 110 before, during, and after the trigger event occurs. For example, in certain embodiments, the CID 10 monitors aspects of the vehicle via the sensing circuitry 46, determines that a trigger event has occurred (e.g., based on a signal the vehicle diagnostic system 118 indicating that the air bags were deployed), and stores the monitoring data associated with the event in the memory circuitry 12 of the CID 10 and/or in the memory circuitry of a server of an online service for later analysis.

In an example embodiment, a CID 10 may be installed in a vehicle 110 and may be coupled to the diagnostic system 118 of the vehicle 110. During operation of the vehicle 110, the CID 10 may receive a signal from the vehicle diagnostic system 118 indicating that the air bags of the vehicle 110 have been deployed. In response, the CID 10 may output a signal, such as a RF beacon, indicating to nearby devices (e.g., cellular phones, traffic cameras, etc.) that an incident has occurred. Accordingly, devices located near the incident may receive the RF beacon and, in response, may automatically or manually capture information (e.g., audio/video data) that may be relevant to a future investigation of the incident. For example, in certain embodiments, cellular phones in the area may receive a communication (e.g., a SMS message) indicating that an accident has occurred, and may prompt the user to record additional information (e.g., audio data, video data, text data) that may be provided to the CID 10 or an online service to facilitate an investigation of the incident. In certain embodiments, certain electronic devices may detect the RF beacon of the CID 10 and respond to the CID 10 (or to an online service) by outputting a signal that identifies the device (e.g., by name, serial number, location, IP address, etc.) as potentially having information relevant to the investigation of the incident. In certain embodiments, the electronic device may automatically transmit the captured data (e.g., recorded audio and/or video data) to the CID 10 or an online service in response to receiving the RF signal from the CID 10 indicating that the incident has occurred.

In another embodiment, the CID 10 may be useful for vehicle and/or personal security applications by law enforcement or military personnel. For example, in certain embodiments, the CID 10 may be installed in a patrol vehicle used by local law enforcement officers in the line of duty. Additionally, in certain embodiments, the CID 10 may include a body-worn microphone and/or camera, a dashboard camera, or other camera devices as a source of audio/video environmental data surrounding on-duty incidents and investigations. Further, in certain embodiments, the entire CID 10 may be embodied entirely within a wearable device, such as a body-worn camera device. As with the embodiments described above, such CID 10 can monitor various aspect of the environment surrounding an incident, including RF wireless communication signals prior to, during, and after the occurrence of a trigger event. In the event of an investigation into an incident, the collected environmental data may be used, for example, as evidence of the presence or absence of a person or group at the incident and/or certain electronic activities (e.g., cellular phone calls, text messages, social media traffic, or generally high/low levels of electronic activity) surrounding the incident. It is envisioned that similar devices might similarly be applicable for monitoring of a number of different types of assets, including soldiers and military vehicles, firefighters and fire engines, and other occupations involving a high number of incidents that involve regular investigation and oversight.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A customer interface device (CID), comprising:
an output device configured to output a beacon;
communication circuitry configured to communicatively couple the CID to an online service;
sensing circuitry configured to detect radio-frequency (RF) communication signals near an asset associated with the CID;
memory circuitry configured to store information regarding the RF communication signals detected by the sensing circuitry; and
processing circuitry coupled to the communication circuitry, the sensing circuitry, and the memory circuitry, wherein the processing circuitry is configured to execute instructions stored in the memory circuitry to:

initiate storage, in the memory circuitry, of the information regarding the RF communication signals detected by the sensing circuitry; and in response to determining that a trigger event has occurred:
provide, via the communication circuitry, the online service with information regarding the RF communication signals detected by the sensing circuitry around the time of the trigger event; and
activate the output device of the CID to emit the beacon, wherein the beacon is recordable by an electronic device collecting a recording near the asset at the time of the trigger event, and wherein the beacon uniquely identifies the time and location of the trigger event in the recording.

2. The device of claim 1, wherein the asset comprises a person.

3. The device of claim 1, wherein the CID comprises an input device configured collect other information near the asset around the time of the trigger event, and wherein the processing circuitry is configured to:
initiate storage, in the memory circuitry of the CID, of the other information collected by the input device;
correlate, in the memory circuitry of the CID, the other information collected by the input device with the information regarding the RF communication signals detected by the sensing circuitry; and
provide, via the communication circuitry, the correlated information to the online service in response to the trigger event.

4. The device of claim 3, wherein the input device comprises a camera, microphone, smoke detector, or motion sensor.

5. The device of claim 1, wherein the CID is configured to communicatively couple to a system associated with the asset to receive other information regarding the asset around the time of the trigger event, wherein the processing circuitry is configured to:
store, in the memory circuitry of the CID, the other information received from the system;
correlate, in the memory circuitry of the CID, the other information received from the system with the information regarding the RF communication signals detected by the sensing circuitry; and
provide, via the communication circuitry, the correlated information to the online service in response to the trigger event.

6. The device of claim 5, wherein the system associated with the asset comprises a home or vehicle security system, a vehicle diagnostic system, or a home automation system.

7. The device of claim 1, wherein the information regarding the RF communication signals comprises a type, frequency, time, date, strength, duration, source location, and source movement of each of the RF communication signals.

8. The device of claim 1, wherein the information regarding the RF communication signals comprises a media access control (MAC) address, a cellular node address, international mobile subscriber identity (IMSI), or a Temporary Mobile Subscriber Identity (TMSI) associated with a wireless device transmitting at least a portion of the RF communication signals.

9. The device of claim 1, wherein the sensing circuitry includes a wireless host device that collects the information regarding the RF communication signals by analyzing the RF communication signals of wireless client devices that attempt to communicate with the wireless host device.

10. The device of claim 1, wherein the electronic device comprises a traffic camera, security camera, or cell phone camera collecting the recording near the asset at the time of the trigger event.

11. The device of claim 1, wherein the beacon is an auditory beacon, a visual beacon, or a combination thereof, having an embedded signal, and the embedded signal uniquely identifies the time and location of the trigger event.

12. The device of claim 11, wherein the embedded signal comprises an ultrasonic tone of an auditory beacon.

13. A method, comprising:
detecting RF signals near an asset using sensing circuitry of a customer interface device (CID) associated with the asset;
storing information regarding the RF signals in memory circuitry of the CID; and
in response to determining, via processing circuitry of the CID, that a trigger event has occurred near the asset associated with the CID:
retrieving from the memory circuitry and providing, as output, information regarding RF signals detected by the sensing circuitry around the time of the trigger event; and
emitting an auditory or visual beacon from an output device of the CID, wherein the auditory or visual beacon is configured to be captured in a recording of a recording device operating near the asset at the time of the trigger event, and wherein the beacon uniquely identifies the time and location of the trigger event in the recording.

14. The method of claim 13, wherein providing the information comprises providing, via an output device of the CID, a report that includes the information regarding the RF signals detected around the time of the trigger event.

15. The method of claim 13, comprising:
receiving, at the processing circuitry of the CID, other information regarding the asset from a device that is associated with the asset and communicatively coupled to the CID;
storing, in the memory circuitry of the CID, the other information received from the device;
correlating, in the memory circuitry of the CID, the other information received from the device with the information regarding the RF communication signals; and
providing, as additional output, the correlated information.

16. The method of claim 15, wherein the other information comprises the tripping of a security system alarm, a fire alarm, or a smoke detector alarm associated with the asset, wherein the trigger event is determined to have occurred based on the other information.

17. The method of claim 13, wherein determining that the trigger event has occurred, comprises:
storing information regarding the RF signals detected by the sensing circuitry of the CID over a first period of time;
analyzing the information collected during the first period of time to determine normal RF activity;
storing information regarding the RF signals detected by the sensing circuitry of the CID over a second period of time;
analyzing the information collected during the second period of time to identify abnormal RF activity; and
determining that the trigger event has occurred based on the identified abnormal RF activity.

18. A non-transitory, computer-readable medium storing instructions executable by a processor of an electronic device, the instructions comprising:
   instructions to detect RF signals near an asset using sensing circuitry of a customer interface device (CID) associated with the asset;
   instructions to store information regarding the RF signals in memory circuitry of the CID;
   instructions to determine, via the processing circuitry, that a trigger event has occurred near the asset associated with the CID;
   instructions to retrieve from the memory circuitry and provide, as output, information regarding RF signals detected by the sensing circuitry around the time of the trigger event; and
   instructions to emit a beacon from an output device of the CID, wherein the beacon is detectable in a recording captured near the asset at the time of the trigger event, and wherein the beacon uniquely identifies the time and location of the trigger event in the recording.

19. The medium of claim 18, wherein the instructions to provide the information comprise instructions to provide the information to an online storage service configured to store the information at a location that is different than that of the asset.

20. The medium of claim 19, wherein the instructions to determine that the trigger event has occurred, comprises:
   instructions to store information regarding the RF signals detected by the sensing circuitry of the CID over a first period of time;
   instructions to analyze the information collected during the first period of time to determine normal RF activity;
   instructions to store information regarding the RF signals detected by the sensing circuitry of the CID over a second period of time;
   instructions to analyze the information collected during the second period of time to identify abnormal RF activity; and
   instructions to determine that the trigger event has occurred based on the identified abnormal RF activity.

* * * * *